Figure 1:
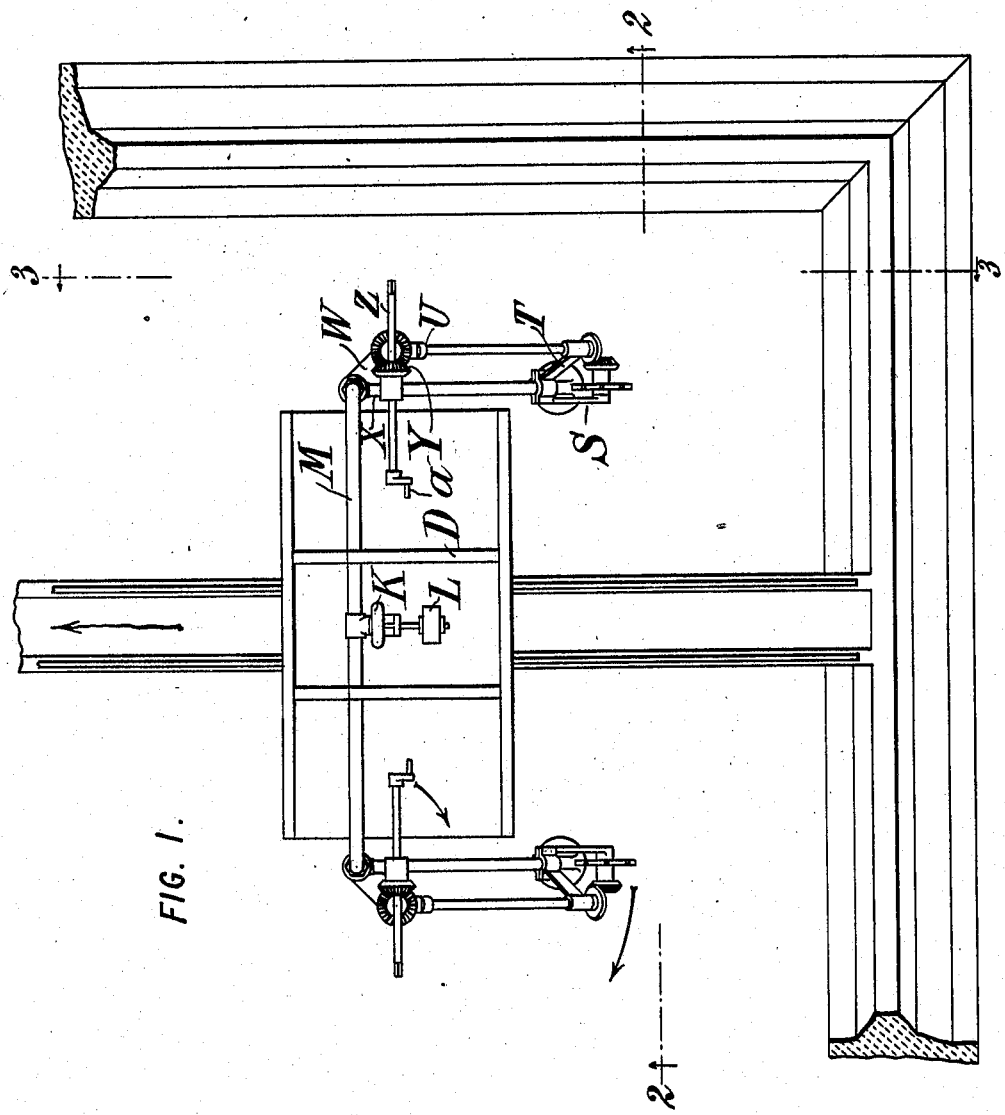

D. C. WILLIAMSON.
REMOVING SLUDGE FROM SEDIMENTATION BASINS AND RESERVOIRS.
APPLICATION FILED NOV. 14, 1907.

908,058.

Patented Dec. 29, 1908.
3 SHEETS—SHEET 1.

WITNESSES:

INVENTOR:
David Charles Williamson,
By, Attorneys

D. C. WILLIAMSON.
REMOVING SLUDGE FROM SEDIMENTATION BASINS AND RESERVOIRS.
APPLICATION FILED NOV. 14, 1907.

908,058.

Patented Dec. 29, 1908.
3 SHEETS—SHEET 2.

WITNESSES:
Fred White
Rene Bruine

INVENTOR :
David Charles Williamson,
By Attorneys.

D. C. WILLIAMSON.
REMOVING SLUDGE FROM SEDIMENTATION BASINS AND RESERVOIRS.
APPLICATION FILED NOV. 14, 1907.
908,058.
Patented Dec. 29, 1908.
3 SHEETS—SHEET 3.
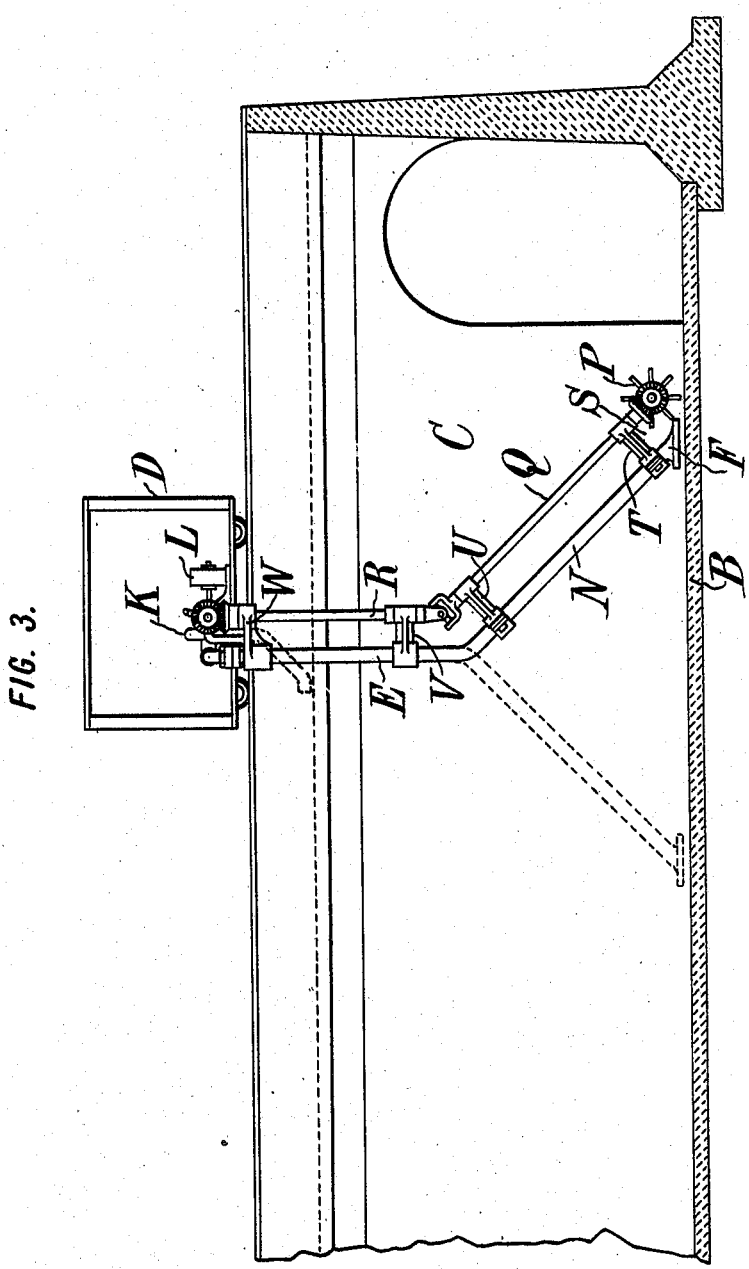
WITNESSES:
INVENTOR:
David Charles Williamson,
By Attorneys,

UNITED STATES PATENT OFFICE.

DAVID CHARLES WILLIAMSON, OF NEW YORK, N. Y.

REMOVING SLUDGE FROM SEDIMENTATION BASINS AND RESERVOIRS.

No. 908,058.　　　　　Specification of Letters Patent.　　　Patented Dec. 29, 1908.

Application filed November 14, 1907. Serial No. 402,106.

*To all whom it may concern:*

Be it known that I, DAVID CHARLES WILLIAMSON, a citizen of the United States, residing in the borough of Manhattan, city, county, and State of New York, have invented certain new and useful Improvements in Removing Sludge from Sedimentation Basins and Reservoirs, of which the following is a specification.

In sedimentation basins and particularly those of filtering plants the problem of effecting a satisfactory removal of the sludge has not been satisfactorily solved in practice. The usual method of removing the sludge is to draw it off, with the water in the basin, through pipes arranged in the bottom of the basin and suitably valved. With such systems, however, the sludge which deposits at a distance from the drainage pipes is left in substantial quantities upon the bottom of the basin after all the water has been drawn off. It has been attempted to obviate this difficulty by providing a number of branch drainage pipes. But the outflowing water always takes the easiest course, and as soon as one of such pipes has become a little choked, the flow of water through it is so retarded as to cause a further deposit of sludge, so as to finally choke it entirely, the water all running off through other branches. The sludge in the neighborhood of the choked pipe of course will not run off.

The present invention aims to obviate these disadvantages and to permit of effecting a perfect cleaning out of the basin with a minimum of difficulty and expense, with a mechanism which is always accessible for inspection or repair, and without the necessity of drawing off the entire basin full of water at each cleaning. Where the water in the basin or reservoir has already been treated with a coagulating agent to accelerate sedimentation and clarification, there is a great economy in cost of such coagulating agent, due to the saving of a great quantity of this water as well as the time for pumping when necessary. A very substantial economy may also be effected where no coagulant is used. Furthermore there is no stoppage of the use of the basin, and a considerable amount of time is thus saved. The sedimentation and also the removal of the sediment may be continuous.

The accompanying drawings illustrate apparatus for carrying out the process.

Figure 2:
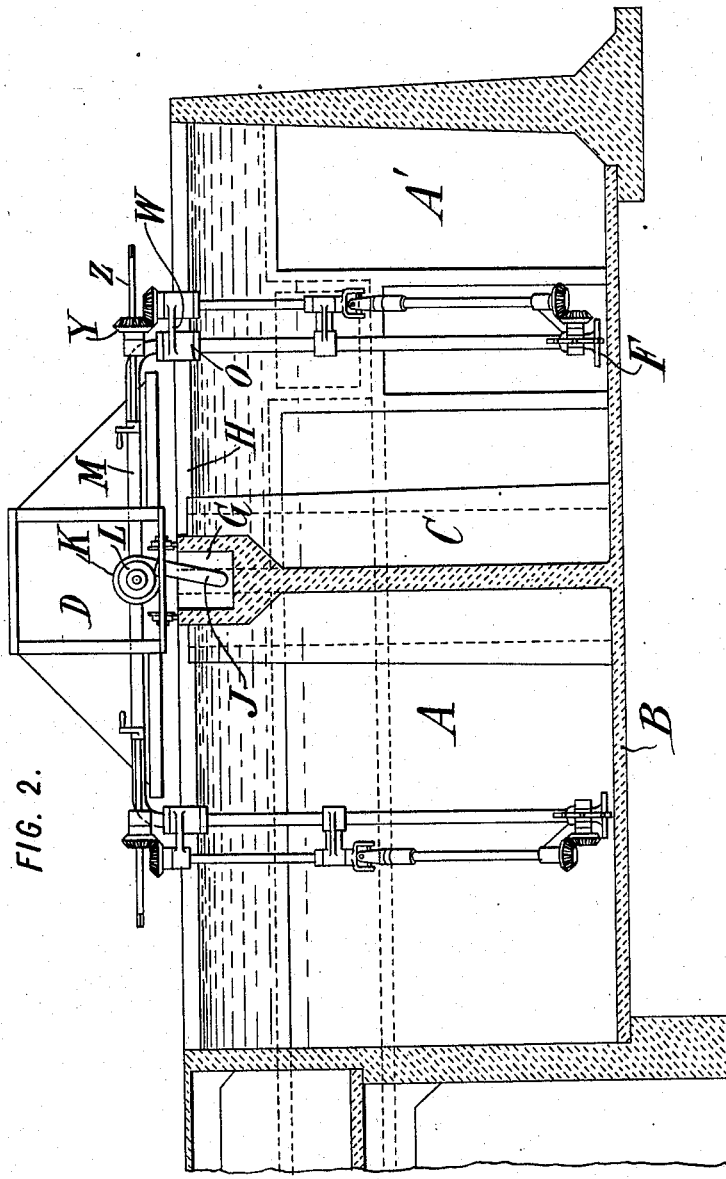

Figure 1 is a plan. Fig. 2 is a vertical cross-section. Fig. 3 is a vertical longitudinal section.

Referring to the particular apparatus illustrated, we suppose it applied to a pair of basins A A' of the usual type. A partition wall C between the two basins supports a carriage D upon which the sludge-removing apparatus is mounted, the carriage traveling on rails supported by the partition. The sludge is taken up through a pipe E having a mouthpiece F near the bottom of the basin, the pipe E extending above the level of the water in the basin and discharging into a trough or sump G formed on the top of the partition wall C, and leading off to any suitable dumping ground. The discharge of the sludge may be effected by siphonic action, as by supposing, for example, that the water level is at H, above the lower end of the discharge pipe J which depends into the trough G. The trough G may be made of such a depth as to permit siphoning action from the ordinary level of water in the basin. For starting the siphon, or for lifting the sludge where the water level is not sufficiently high above the outlet to effect a siphoning action, a pump K may be mounted on the carriage D operated by an engine or motor L, having its inlet connected by a horizontal pipe M with the suction pipe E, and having its outlet connected to the discharge pipe J.

The longitudinal movement of the carriage D effects the passage of the mouthpiece F longitudinally over the bottom of the basin. To obtain a transverse adjustment, the suction pipe E has its lower portion N bent at a sufficient angle, and is swiveled at its upper end in the connection O with the horizontal pipe M.

The sludge sometimes cakes quite hard, and it is this caking which causes the great difficulty of removing it by ordinary drainage. By operating my system as described herein continuously or at suitable periods, the sludge will not be allowed to accumulate to any substantial extent, and the caking will be less serious. But where the composition of the water and the coagulent, or other conditions, causes the sludge to cake so hard as to resist removal by the suction of the pump or siphon, there may be provided an agitator adjacent to the mouthpiece F. For example, a toothed wheel P may be arranged just beyond the mouth of the suction pipe, to be rotated by any suitable flexible or bent shaft, as, for example, by means of beveled pinions from the shaft Q parallel with the pipe N and which is connected by a universal joint with a vertical shaft R adjacent to the vertical pipe E, the shaft R being in turn rotated by a pair of beveled pinions at its upper end. The wheel P and its shafts Q and R are supported by suitable brackets S, T, U, V and W from the suction pipe. The bracket W has an upwardly and horizontally projecting arm X carrying a bearing for the pinion Y from which the agitator is driven. The pinion Y is rotated by means of a shaft Z sliding therethrough, and provided on its inner end with a crank $a$. The operator by manipulating the inner end of the shaft Z may swing the suction pipe about a vertical axis, and by manipulating the crank $a$ when necessary may stir up the sludge. The carriage may be pushed along the track by hand or by a suitable connection with the motor L, or otherwise as desired. Where a double tank A A' is used, a single discharge pipe J and pump K are made to serve for a pair of suction pipes which are identical with each other and which serve to balance the carriage D on its track.

The manner of supporting and moving the apparatus over the bottom of the tank may be varied in a number of ways. The design of such features of construction will be modified as required to meet the design of the basin or basins containing the water to be clarified. Other mechanism for swinging the mouthpiece transversely may be adopted. Instead of the carriage or trolley D may be substituted a float with a flexible discharge pipe or with a rigid discharge pipe extending always over a wall of the tank. Where the tank is circular, the mouthpiece may be arranged to swing about a support fixed at the center.

In considering the utility of the invention, it should be understood that after the introduction of the coagulant into the water the sludge forms and precipitates very quickly, so as to leave a large body of comparatively clear water except near the bottom. By moving the suction pipe mouthpiece over the bottom, the sludge and roily water of the bottom will be brought up together without any objectionable disturbance.

In preferred practice it would be desirable when removing the sludge as described above, to permit the water to flow in the basin or reservoir in the usual manner, this procedure, however, not being essential to the operation; if preferred by the operator the influent water could be stopped, and water in the basin drawn down to the extent of the volume required to force the sludge from the bottom of the basin through the suction pipe, and this volume would be small compared with that required by the present usual method of completely drawing off the basinful.

The swinging of the suction pipe and the driving of the agitator may be effected by motive power, if preferred.

What I claim is:—

1. In combination with a sedimentation basin having a fixed bottom, an apparatus including a suction pipe extending nearly to the bottom of the basin, and means for sucking up the sludge through said pipe.

2. In combination with a sedimentation basin, having a fixed bottom, an apparatus including a suction pipe and a mouth-piece therefor arranged near the bottom of the basin and adapted to be shifted over such bottom to take up the sludge at various points.

3. An apparatus for removing sludge from sedimentation basins, including a vertical suction pipe E, a pipe N at the lower end of said suction pipe E and arranged at an angle thereto, and a mouth-piece F on the lower end of said pipe N, said pipe E being arranged to rotate about its axis so as to permit the swinging of the mouth-piece F over the bottom of the basin.

4. An apparatus for removing sludge from sedimentation basins, including a vertical suction pipe E, a pipe N at the lower end of said suction pipe E and arranged at an angle thereto, a mouth-piece F on the lower end of said pipe N, said pipe E being arranged to rotate about its axis so as to permit the swinging of the mouth-piece F over the bottom of the basin, and a carriage D carrying said pipe E for shifting the same bodily along the basin.

5. An apparatus for removing sludge from sedimentation basins, including a vertical suction pipe E, a pipe N at the lower end of said suction pipe E and arranged at an angle thereto, a mouth-piece F on the lower end of said pipe N, said pipe E being arranged to rotate about its axis so as to permit the swinging of the mouth-piece F over the bottom of the basin, a carriage D carrying said pipe E for shifting the same bodily along the basin, a suction pump K on said carriage connected to said pipe E, and a motor L for operating said pump.

6. An apparatus for removing sludge from sedimentation basins, including a suction pipe having a mouth-piece arranged to be adjusted over the bottom of the basin, and an agitator adjacent to said mouth-piece and means for forcibly operating said agitator to break up the sludge and facilitate its removal.

7. An apparatus for removing sludge from sedimentation basins, including a suction pipe E N, a mouth-piece F on the lower end thereof, an agitator P adjacent to said mouth-piece, and a shaft for operating said agitator.

8. An apparatus for removing sludge from sedimentation basins, including a suction pipe E N, a mouth-piece F on the lower end thereof, an agitator P adjacent to said mouth-piece, a shaft for operating said agitator, a driving pinion Y for said shaft, and a crank shaft Z for rotating said pinion Y and adapted to slide through said pinion.

9. An apparatus for removing sludge from sedimentation basins, including a suction pipe E N, a mouth-piece F on the lower end thereof, an agitator P adjacent to said mouth-piece, a shaft for operating said agitator, a driving pinion Y for said shaft, a crank shaft Z for rotating said pinion Y and adapted to slide through said pinion, said pipe E being rotatable about a vertical axis, and an arm X for rotating said pipe E and carrying at its end the bearing of said pinion Y, whereby the shaft Z may be used to angularly adjust the pipe E and also to rotate the agitator.

10. In combination with a sedimentation basin having a fixed bottom, an apparatus including a suction pipe having its inlet end extending nearly to the bottom of the basin to take up the sludge, the mouth of said suction pipe being approximately parallel with said bottom so as to take up a minimum quantity of water with the sludge.

11. In combination, a sedimentation basin having a wall carrying a trough, and means for sucking up the sludge from said basin and discharging it into said trough.

12. In combination, a sedimentation basin having a wall carrying a trough, and means supported by said wall for sucking up the sludge from the bottom of said basin and discharging it into said trough.

13. In combination, a sedimentation basin having a fixed flat bottom, and a suction pipe having a mouth-piece close to said bottom and arranged to be adjusted over the same so as to directly suck up the sludge from various points of the bottom.

In witness whereof, I have hereunto signed my name in the presence of two subscribing witnesses.

DAVID CHARLES WILLIAMSON.

Witnesses:
DOMINGO A. USINA.
FRED WHITE.